US006291757B1

(12) United States Patent
Yamanoue

(10) Patent No.: US 6,291,757 B1
(45) Date of Patent: Sep. 18, 2001

(54) APPARATUS AND METHOD FOR PROCESSING MUSIC DATA

(75) Inventor: Kaoru Yamanoue, Tokyo (JP)

(73) Assignee: Sony Corporation Entertainment Inc., Tokyo (JP)

( * ) Notice: Subject to any disclaimer, the term of this patent is extended or adjusted under 35 U.S.C. 154(b) by 0 days.

(21) Appl. No.: 09/466,721

(22) Filed: Dec. 17, 1999

(30) Foreign Application Priority Data

Dec. 17, 1998 (JP) ........................................ 10-358795

(51) Int. Cl.[7] ........................ G01H 1/18; G01H 7/00

(52) U.S. Cl. ........................................ 84/615; 84/653

(58) Field of Search ........................ 84/615, 618, 622, 84/653, 656, 659

(56) References Cited

U.S. PATENT DOCUMENTS

| | | | | |
|---|---|---|---|---|
| 4,412,470 | | 11/1983 | Jones . | |
| 5,121,667 | | 6/1992 | Emery et al. . | |
| 5,448,009 | | 9/1995 | Kudo . | |
| 5,604,324 | | 2/1997 | Kubota et al. . | |
| 5,864,082 | * | 1/1999 | Hirano | 84/659 |
| 5,898,118 | * | 4/1999 | Tamura | 84/618 X |
| 5,945,620 | * | 8/1999 | Adamson | 84/615 |
| 5,955,691 | * | 9/1999 | Suzuki et al. . | |

FOREIGN PATENT DOCUMENTS

WO 90/03640 4/1990 (WO) .

* cited by examiner

*Primary Examiner*—Jeffrey Donels
(74) *Attorney, Agent, or Firm*—Helfgott & Karas, PC.

(57) ABSTRACT

It is an object of the present invention to, in the music data processing apparatus, reduce the complex processings in each of the computing units and access to the shared region of the main memory unit and to generate more efficiently the music data. According to the music data processing apparatus, the computing units (31) to (33) of the operating device unit (2) perform specified operations on data necessary for generating music that is stored in a main memory (3) and store "1" as the respective flags indicating the completion of the operating process in a synchronization notification information designating part (9) of the main memory (3). A synchronization notification information processing part (5) has a synchronization notification information switching part (13) which, in response to a control signal from a CPU (42), determines whether or not all of the processes of the computing units (31) to (33) have been completed according to whether or not all of the stored flags "1" have been received. The apparatus also includes a synchronization notification information operation part (14) which receives those determination results, and provides them to status holding parts of the computing units (31) to (33).

12 Claims, 6 Drawing Sheets

APPARATUS AND METHOD FOR PROCESSING MUSIC DATA

BACKGROUND OF THE INVENTION

1. Field of the Invention

The present invention relates in general to an apparatus and method for generating music data and a medium for providing music data, and more particularly to a music data generating apparatus and method and a medium for providing a program for generating music data that are suitable for synchronous control processing among multiple incorporated computing units.

2. Description of the Prior Art

In a music data generating apparatus which contains a plurality of computing units and generates music data by interlinking these computing units and performing operating processes, if it is decided that, in accordance with some kind of timing among the computing units, the music data generating processes of other units have been completed (synchronization has been achieved), when each computing unit has received notification that synchronization has been achieved, in the past, normally a method has been used whereby the notification is received either passively by means of an interrupt from another computing unit, or actively by sequentially confirming specified variables corresponding to synchronization information that have been assigned in advance in a main memory.

Nevertheless, when an interrupt is passively received by each computing unit, it is necessary to incorporate into each computing unit a processing content that differs from the normal processing flow, and the interrupt process itself also becomes a complex and troublesome process for the computing units (e.g., saving of the working register, etc.). Moreover, in the case where each computing unit actively operates by frequently accessing a main memory and sequentially confirming specified variables corresponding to synchronization information, since several computing units are frequently and continuously accessing the common part (main bus) of the main memory, due to the complexity of this accessing process, the process often interferes with the process of accessing the main memory by other computing units.

SUMMARY OF THE INVENTION

The present invention was made in light of this situation and has an object of using a status holding part, which enables each computing unit to perform access within its own resources. By providing access parts in the main memory separately for each computing unit and performing synchronization information processing using an external synchronization information processing part, the present invention makes it possible to reduce the amount of complex processing performed by each computing unit and to reduce the amount of accessing to shared regions in the main memory.

The above and other objects of the present invention are attained by a music data generating apparatus comprising: a plurality of computing units each including a status holding part for performing access within own resources thereof and branch processing and carrying out specified operations on data necessary for music generation; memory means, which stores completion results of operating processes of said plurality of computing units; and distribution means, which distributes the completion results stored in said memory means to the status holding parts of said computing units.

According to the present invention a music data generating method comprises: a plurality of operating steps, which have a status holding function to perform access within its own resources and branch processing, and to carry out specified operations on data necessary for music generation; a step of storing the completion results of operating processes of said plurality of operating steps; and a step of distributing the completion results stored by said storing step to the status holding function of said operating steps.

The music data providing medium of the present invention includes a program whereby a music data generating apparatus is made to execute a process comprising: a plurality of operating steps, which have a status holding function that can perform access within its own resources and branch processing and which carry out specified operations on data necessary for music generation; a storing step for storing completion results of operating processes of said plurality of operating steps; and a distribution step for distributing the completion results stored in said storing step to the status holding functions of said operating steps.

In the present invention, specified arithmetic operations are performed on the data necessary for generating music, flags, for example, respectively representing the completion of an arithmetic operation are stored, and it is determined whether or not all of the processes have been completed from the stored flags, and the determination results are provided.

DETAILED DESCRIPTION OF THE PREFERRED EMBODIMENT

Figure 1:
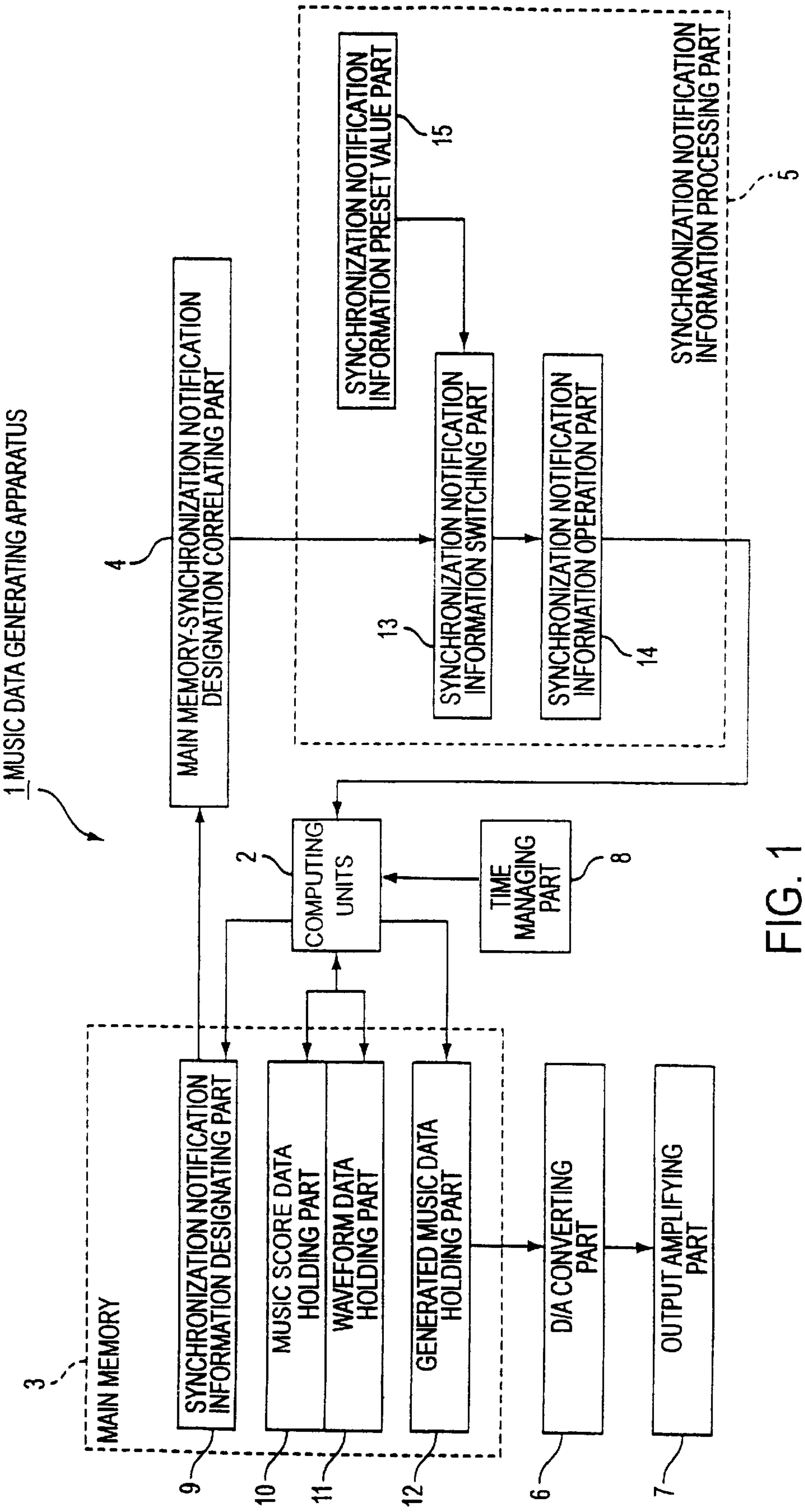
FIG. 1 is a block diagram showing an embodiment of a music data generating apparatus according to the present invention.

One embodiment of the music data generating apparatus of the present invention is explained below referring to the drawings. FIG. 1 is a block diagram showing the configuration of a music data generating apparatus 1 in which the present invention is used. An computing unit part 2 is composed of a plurality of computing units, and performs various processes in accordance with predetermined computer programs that are internally stored. A main memory part 3 includes a synchronization notification information part, a music score data holding part 10, a waveform data holding part 11 and a generation music data holding part 12. Each computing unit of the computing unit part 2 generates, and holds in the generated music data holding part 12, music data corresponding to various types of input data such as music score data that is held in the music score data holding part 10 and waveform data that is held in the waveform data holding part 11 of the main memory part 3. The main memory part 3 properly stores and holds various types of data and programs. The synchronization notification information designating part 9 of the memory part 3 updates and holds logical values corresponding to specified commands from each computing unit of the computing unit part 2. The apparatus further includes a main memory-synchronization notification designation correlating part 4 which monitors (receives) logical values from the synchronization notification information designating part 9 of the main memory part 3 and supplies them to a synchronization notification information switching part 13 of a synchronization notification information processing part 5.

The synchronization notification information switching part 13 of the synchronization notification information processing part 5 selects either the main memory-synchronization notification designation correlating part 4 or a synchronization notification information preset value part 15 of the synchronization notification information processing parts and connects it to a synchronization notification information operation part 14. The synchronization notification information preset value part 15 stores the true logical value "1", and when this itself is connected with another apparatus, it outputs this value to the apparatus to which it is connected. The synchronization notification information operation part 14, upon receiving the synchronization notification information or preset value of the synchronization notification information preset value part 15, computes the logical product (evaluates the synchronization information), and outputs the operation results to each computing unit of the computing unit part 2.

The apparatus of the present invention also includes a D/A converting part 6 which receives digital signals corresponding to the generated music data that is held in the generated music data holding part 12 of the main memory part 3, converts the digital signal into an analog signal that can be reproduced normally, and outputs that signal to an output amplifying part 7 of the apparatus. The output amplifying part 7 finally outputs an analog signal corresponding to the music data supplied from the D/A converting part 6 to an external speaker, etc. A time managing part 8 notifies the computing unit part 2 of the time, and the computing unit part 2 carries out the music data generating process in response to this time notification.

Figure 2:
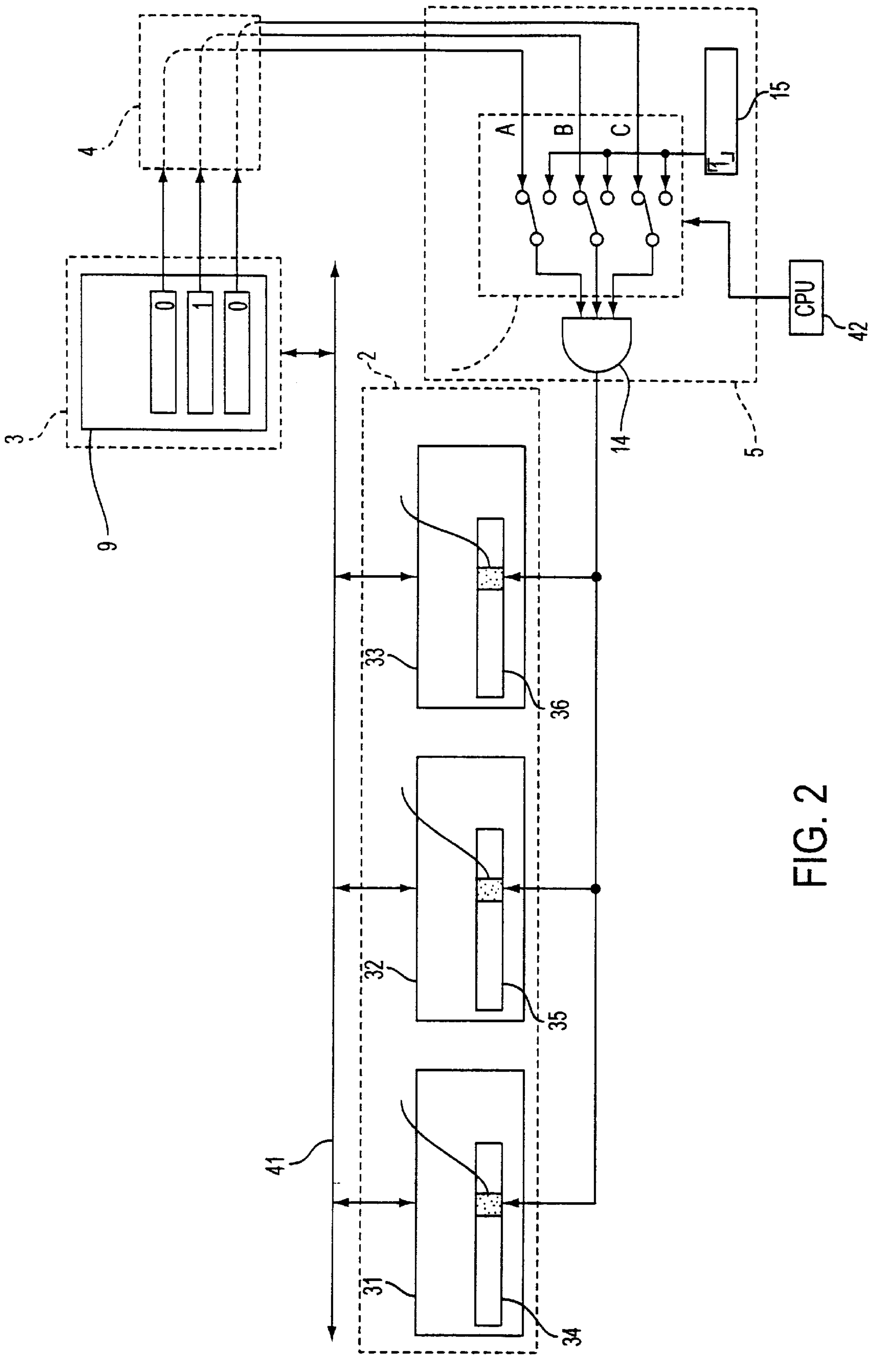
FIG. 2 is a diagram showing the detailed configuration of a main part of the music data generating apparatus of FIG. 1.

FIG. 2 is a diagram showing a detailed configuration of the important parts of the apparatus shown in FIG. 1. Computing units 31 through 33, which constitute the computing unit part 2, based on a time for which notification has been received from the time managing part 8 shown in FIG. 1, carry out respective music data generating processes to be performed in a specific timing between the computing units. When the processing is completed, the processed data is transferred via a main bus 41 to and held in the main memory part 3, while flags corresponding to the completion of processing are stored in the corresponding storage parts of the synchronization notification information designating part 9 of the main memory part 3. The computing units 31 through 33 then each monitor the values of the respective synchronization bits of status holding parts 34 through 36 and determine whether or not the processes carried out in parallel by the other computing units have been completed (i.e., whether or not synchronization has been achieved with the process of the other computing units). When it has been confirmed in the computing units 31 through 33 that all processes performed in parallel have been finished (synchronization has been achieved), the computing units perform their next respective processes using the data held in the main memory part 3. Here the computing units 31 to 33 are able to perform in the status holding parts 34 to 35 access within their own resources, and, in accordance with the value of the synchronization bits, control the transition of notification and processing by a process similar to a branching operation.

When the synchronization notification information designating parts 9 of the main memory part 3 receive flags corresponding to the completion of the aforementioned music data generating processes from the computing units 31 through 33 of the computing unit part 2, true logical values "1" corresponding thereto are established, and the flags corresponding to each computing unit (namely in initial status, set as the false logical value "0", are updated and held). The main memory-synchronization notification designation correlating part 4 monitors the flags and provides them to the synchronization notification information switching part 13 of the synchronization notification information processing part 5. In the following description, for the sake of convenience the flags of computing units 31 through 33 are referred to as A, B, and C, respectively.

The synchronization notification information switching part 13 of the synchronization notification information processing part 5, in response to control signals from a CPU 42, selects flag A, B, or C from the main memory-synchronization notification designation correlating part 4 or a logical value "1" output by the synchronization notification information preset value part 15, outputting it to the synchronization notification information operation part 14 as an AND circuit.

Figure 3:
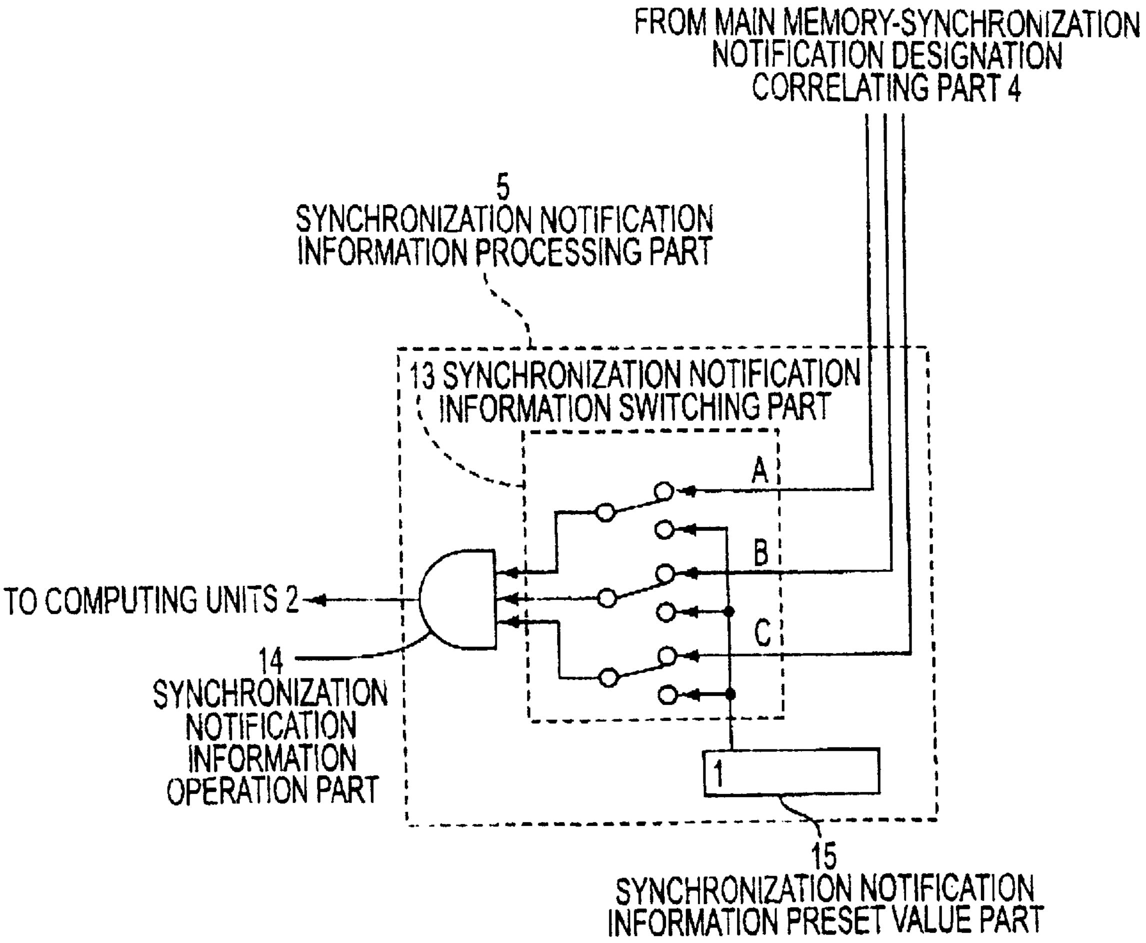
FIG. 3 is a diagram explaining the principle of the operation of the synchronization notification information processing part shown in FIG. 2.
Figure 4:
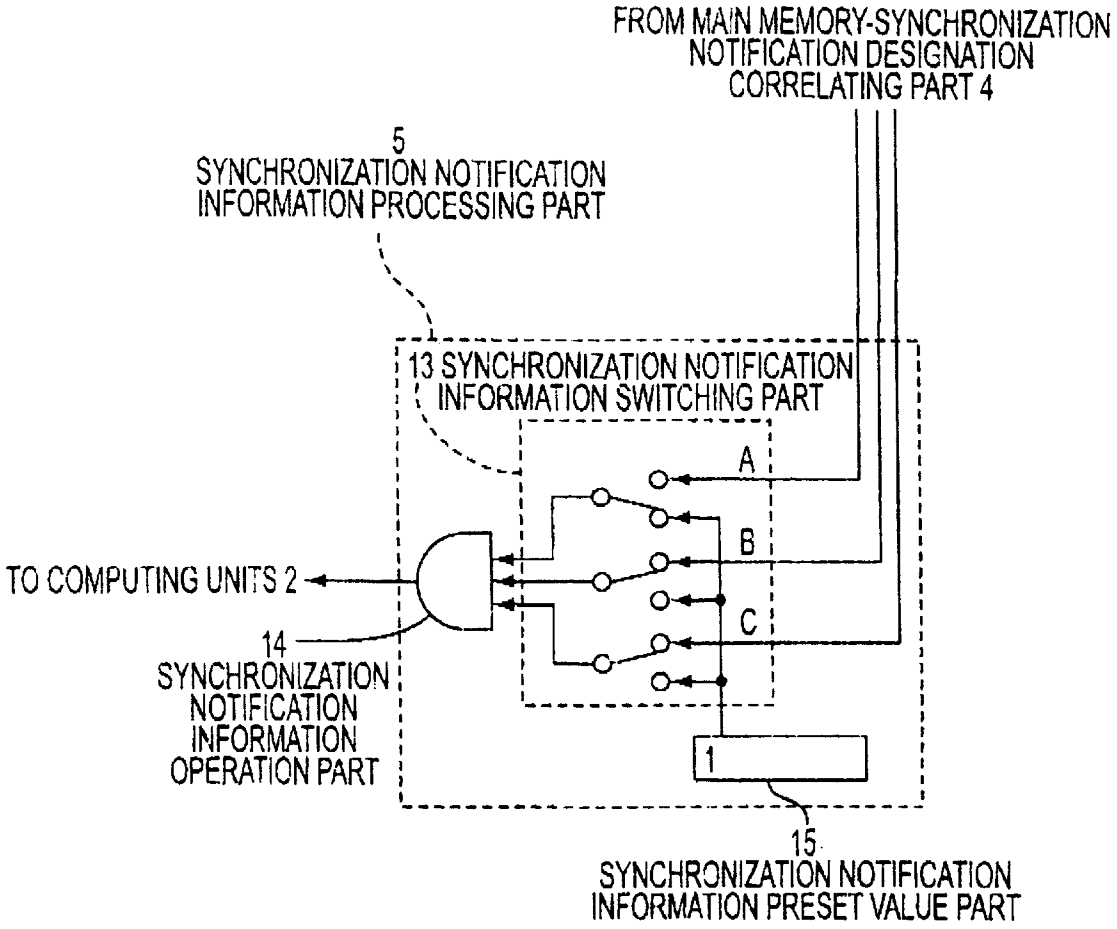
FIG. 4 is a diagram explaining an example of the operation of the synchronization notification information switching part shown in FIG. 2.

As shown in FIG. 3 the CPU 42, when synchronization of the processes performed by computing units 31 through 33 is necessary, for example, outputs all of the flags A, B, and C to the synchronization notification information operation part 14. On the other hand, for example, when, among computing units 31 through 33, the process of computing unit 31 only does not require synchronization with the other computing units 32 and 33, as shown in FIG. 4, the flags B and C corresponding to computing units 32 and 33 continue to be input to the synchronization notification information operation part 14, but, instead of flag A corresponding to computing unit 31, the output "1" of the synchronization notification information preset value part 15 is input to the synchronization notification information operation part 14. In other words, in this case the flag A corresponding to the computing unit 31 is set as a dummy value (forcibly) to "1".

Referring back to FIG. 2, it will be further described. When synchronization notification information operation part 14 is provided with flags A, B, and C (or a flag of the preset value "1"), it calculates the logical product thereof. When all of the flags A, B, and C have been changed to "1", the operation result of the logical product calculation is changed to "1", otherwise, to "0". This operation result is output to the status holding parts 34 through 36 of the computing units 31 through 33 of the computing unit part 2, and the synchronization bits thereof are updated in accordance with this operation result. Accordingly, the computing units 31 through 33, by monitoring the status of their respectively status holding parts 34 through 36, which are their own resources, are able to determine whether or not synchronization has been achieved with the other computing units.

Figure 5:
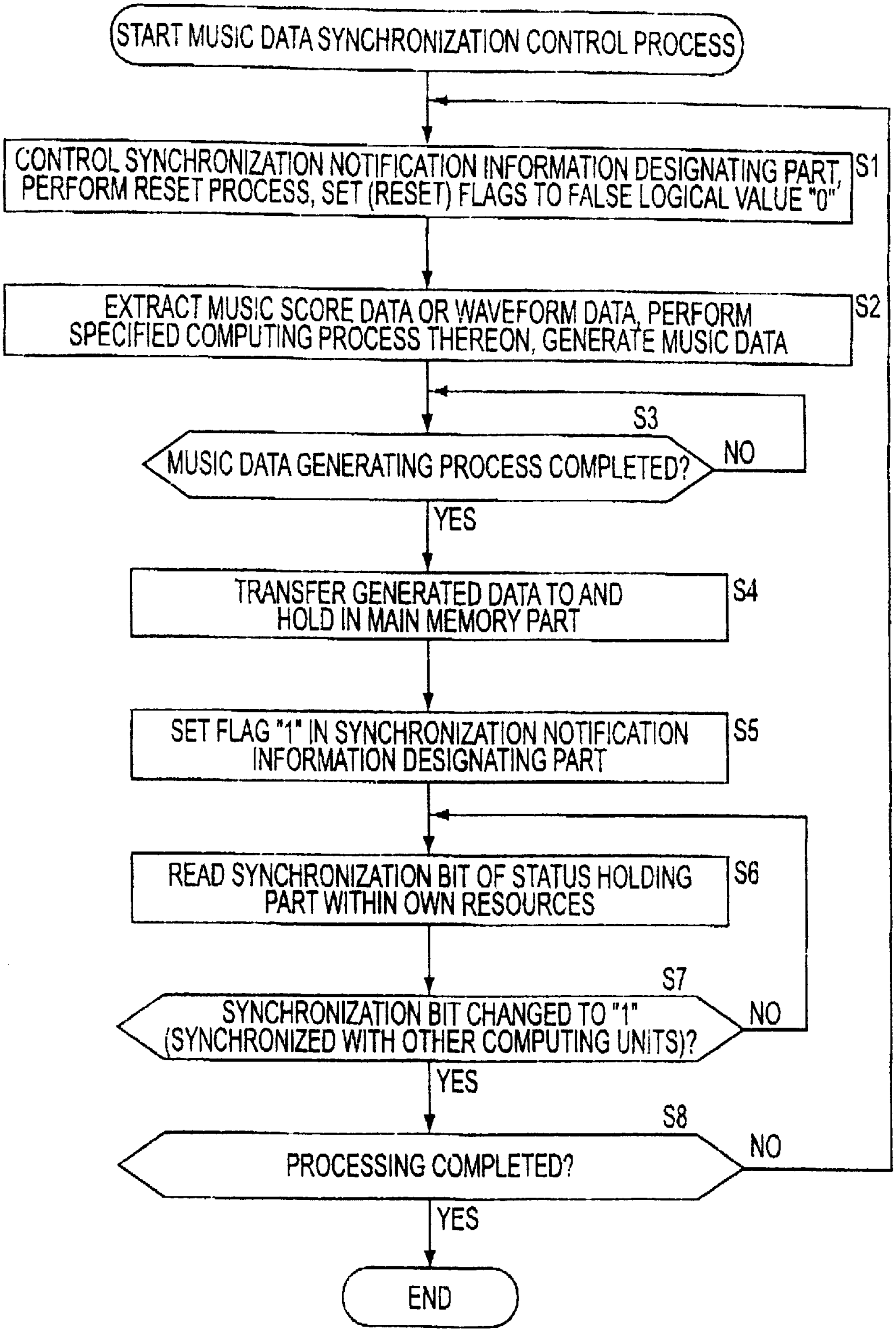
FIG. 5 is a flowchart used to explain the process performed by one of the computing units shown in FIG. 2.

FIG. 5 is a flowchart used to explain the process of controlling synchronization of the music data by means of the computing unit 31 of the computing unit part 2 (the computing units 32 and 33 perform similar processes). First, in step S1, the computing unit 31 of computing unit part 2 transmits the flag of "0", which is a false logical value, as a flag corresponding to itself, to and updates or resets the synchronization notification information designating part 9 of the main memory part 3 via the main bus 41. "0" is a flag which indicates that the music data generating process being performed from this point by the computing unit 31 is not yet completed, and this flag is input to the main memory-synchronization notification designation correlating part 4 and, via the synchronization notification information switching part 13, to the synchronization notification information operation part 14.

In step S2, the computing unit 31 reads specified music score data or waveform data from the music score data holding part 10 or waveform data holding part 11 (the data read differs according to the operation performed by the computing unit 31). By performing a specified operating process on that data the computing unit 31 generates music data. In step S3, the computing unit 31 stands by until the music data generating process is completed, and when the music data generating process is completed, the process advances to step S4, where it transmits the generated music data via the main bus 41 to the main memory part 3 which holds the same.

In step S5 the computing unit 31 outputs the true logical value "1" to the synchronization notification information designating part 9 of the memory part 3 as a flag which indicates that the music data generating process within itself has been completed, updating the value "0" that has been preset in step S1 to "1". In step S6 the computing unit 31 reads the logical value of the synchronization bit of the status holding part 34. The value of the flag of each computing unit reflects this logical value as explained above.

In step S7 the computing unit 31 stands by until the logical value of the synchronization bit of the status holding part 34 is changed to "1" (Synchronization with the other computing units 32 and 33 in the computing unit part 2 is achieved). When the logical value of the synchronization bit of the status holding parts 34 changes from "0" to "1", the process flow advances to step S8, and it is determined whether or not processing has been finished. If it is determined that processing is not yet finished, the flow returns to step S1, and the computing unit 31 repeats the processes subsequent thereto. If it is determined that processing has been finished, the computing unit 31 finishes all of its processes.

Figure 6:
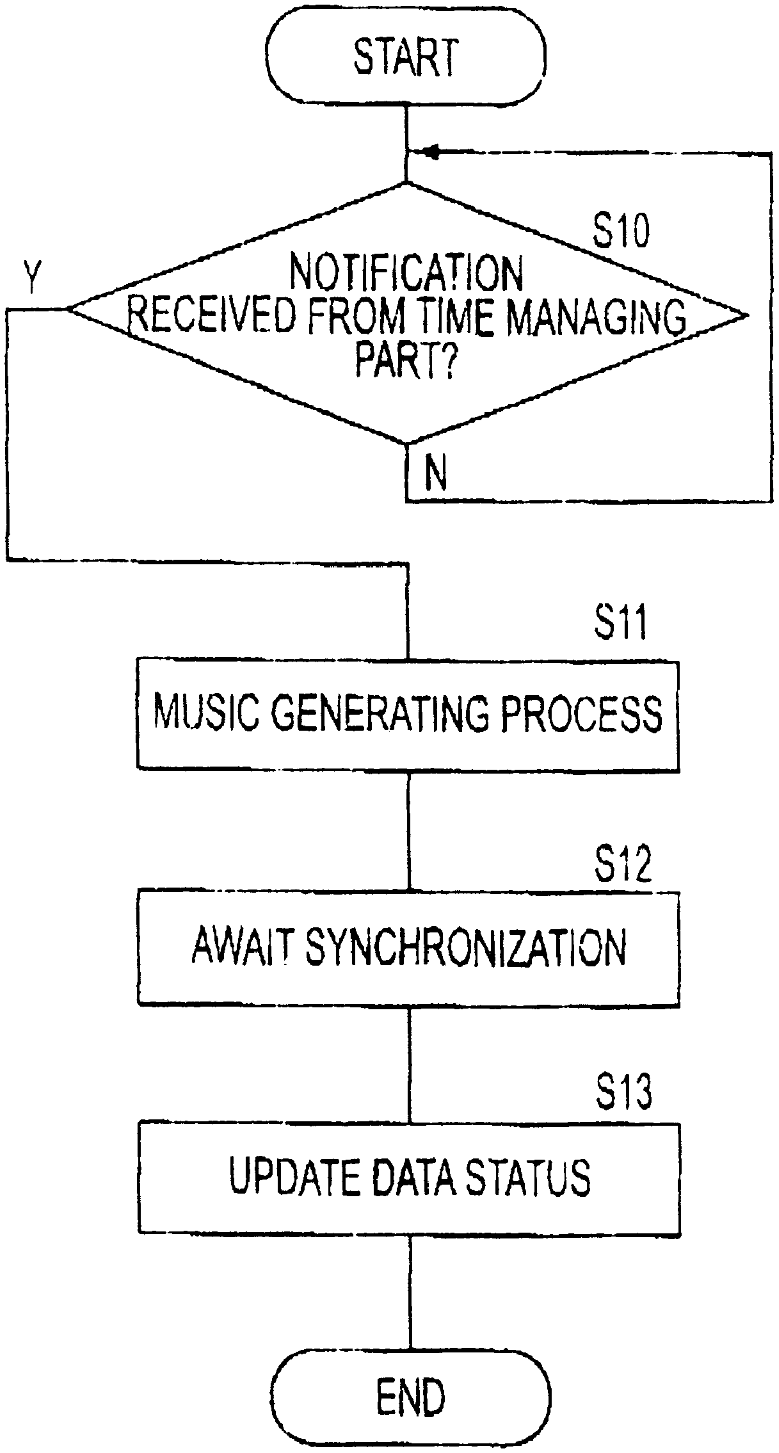
FIG. 6 is a simplified flowchart of the overall process.

FIG. 6 is a flowchart in which all the processes including the flowchart shown in FIG. 5 are simplified. As shown in FIG. 6, presuming notification of the time on the time managing part 8 (step S10), the process described in FIG. 5, i.e., the music generating process (step S11) and the synchronization waiting process (step S12) in FIG. 6 are performed, and then, by establishing synchronization, the updating (step S13) of the data status (music score data and waveform data) is performed.

The music data providing medium of the present invention which provides the user with computer programs to carry out the aforesaid processes, besides information recording media such as magnetic disks and CD-ROMS, may also be network transmission media such as the Internet, digital satellites, etc.

While there has been described that, the main memory-synchronization notification designation correlating part 4, the synchronization notification information switching part 13, and the synchronization notification information operation part 14 are controlled by setting up flags in the synchronization notification information designating part 9 of the memory part 3 by means of synchronization bits of the status holding parts 34, 35, and 36, the synchronization bits of the status holding parts 34, 35, 36 may also be changed based on the storage completion results of identifiers or identification signals corresponding to flags.

Furthermore, according to the present invention, a plurality of completion results corresponding to the number of computing units are conveyed by means of flags, for example, as far as the synchronization notification information operation part 14. However, the plurality of completion results may be processed in a part close to the computing units such as the main memory part 3, and a completion result that has been synchronized rather than a plurality of completion results may be transferred in a pre-processing stage.

In this way, according to the music data generating apparatus, music data generating method and music data providing medium of the present invention, since specified operations are performed on the data necessary for generating music, for example, the respective flags representing the completion of the processes are stored, it is determined from the stored flags whether or not all of the processing has been completed, and the determination results are provided. Therefore, complex processing by each computing unit can be reduced, the access to common regions in the main memory part can be reduced, and a more efficient music data generating process can be achieved.

What is claimed is:

1. An apparatus for processing data utilized in the generation of music comprising:

a plurality of operating means for performing operations, controlled by predetermined computer programs, on data utilized in generating music, each operating means including a status holding part that allows access within own resources thereof and a branch processing;

a memory means, which stores completion results of the operations of said plurality of operating means; and a distribution means, which distributes the completion results stored in said memory means to the status holding parts of said plurality of operating means.

2. An apparatus for processing data utilized in the generation of music comprising:

a plurality of operating means for performing operations, controlled by predetermined computer programs, on data utilized in generating music, each operating means including a status holding part that allows access within own resources thereof and a branch processing;

a memory means, which corresponds to the number of said plurality of operating means and stores a plurality of completion results of the operations;

a decision means, which decides from the plurality of completion results stored in said memory means whether or not all of the operations of said plurality of operating means have been completed; and a distribution means, which receives and distributes to the status holding parts of said plurality of operating means an input of decision results of said decision means.

3. An apparatus for processing data utilized in the generation of music comprising:

a plurality of operating means for performing operations, controlled by predetermined computer programs, on data utilized in generating music, each operating means including a status holding part that allows access within own resources thereof and a branch processing;

a memory means, which stores flags expressing completion results of the operations of said plurality of operating means; and a distribution means, which distributes the completion results in the form of the flags stored in said memory means to the status holding parts of said plurality of operating means.

4. An apparatus for processing data utilized in the generation of music comprising:

a plurality of operating means for performing operations, controlled by predetermined computer programs, on data utilized in generating music, each operating means including a status holding part that allows access within own resources thereof and a branch processing;

a memory means, which stores a plurality of flags representing completion results of the operations of said plurality of operating means; and a decision means, which decides from the plurality of flags stored in said memory means whether or not all of the processes of said plurality of operating means have been completed; and a distribution means, which receives and distributes to the status holding parts of said plurality of operating means decision results of said decision means.

5. A music data processing method comprising the steps of:

processing in each of a plurality of processing units data utilized in generating music, the processing including accessing a status holding part associated with each processing unit and branch processing;

storing completion results of the processing step from each processing unit; and distributing the completion results from each processing unit stored in said storing step to the status holding part associated with each processing unit.

6. A music data processing method comprising the steps of:

processing in each of a plurality of processing units data utilized in generating music, the processing including accessing a status holding part associated with each processing unit and branch processing;

storing a plurality of completion results of the processing step from each processing unit;

deciding from the plurality of completion results stored in said storing step whether or not all of the processing in each of the plurality of processing units has been completed; and distributing to the status holding part associated with each processing unit an input of decision results of said decision step.

7. A music data processing method comprising the steps of:

processing in each of a plurality of processing units data utilized in generating music, the processing including accessing a status holding part associated with each processing unit and branch processing;

storing flags expressing completion results of the processing step from each processing unit; and distributing the completion results according to the flags stored in said storing step to the status holding part associated with each processing unit.

8. A music data processing method comprising the steps of:

processing in each of a plurality of processing units data utilized in generating music, the processing including accessing a status holding part associated with each processing unit and branch processing;

storing a plurality of flags representing completion results of the processing step from each processing unit; and deciding from the plurality of flags stored in said storing step whether or not all of the processing in each of a plurality of processing units has been completed; and distributing to the status holding part associated with each processing unit the decision results of said decision step.

9. A computer-readable medium having stored thereon computer-executable instructions for performing the steps comprising:

causing a plurality of processors to execute specified operations on data utilized in generating music, said operations including branch processing and accessing a status holding part associated with each processor;

storing of completion results of the specified operations of the plurality of processors; and distributing the completion results stored in said storing step to the status holding part associated with each processor.

10. A computer-readable medium having stored thereon computer-executable instructions for performing the steps comprising:

causing a plurality of processors to execute specified operations on data utilized in generating music, said operations including branch processing and accessing a status holding part associated with each processor;

storing a plurality of completion results of the specified operations of the plurality of processors corresponding to the number of said plurality of processors;

deciding from the plurality of completion results stored in said storing step whether or not all of the specified operations of said plurality of processors has been completed; and distributing to the status holding part associated with each processor the decision results of said decision step.

11. A computer-readable medium having stored thereon computer-executable instructions for performing the steps comprising:

causing a plurality of processors to execute specified operations on data utilized in generating music, said operations including branch processing and accessing a status holding part associated with each processor;

storing flags expressing completion results of the specified operations of said plurality of processors; and distributing the completion results according to the flags stored in said storing step to the status holding part associated with each processor.

12. A computer-readable medium having stored thereon computer-executable instructions for performing the steps comprising:

causing a plurality of processors to execute specified operations on data utilized in generating music, said operations including branch processing and accessing a status holding part associated with each processor;

storing a plurality of flags representing completion results of the specified operations of said plurality of processors;

deciding from the plurality of flags stored in said storing step whether or not all of the specified operations of said plurality of processors has been completed; and distributing to the status holding part associated with each processor the decision results of said decision step.

* * * * *